(12) United States Patent
Denis et al.

(10) Patent No.: US 11,218,211 B2
(45) Date of Patent: Jan. 4, 2022

(54) ITERATIVE BEAM TRAINING METHOD FOR ACCESSING A MM-WAVE NETWORK

(71) Applicant: COMMISSARIAT A L'ENERGIE ATOMIQUE ET AUX ENERGIES ALTERNATIVES, Paris (FR)

(72) Inventors: Benoît Denis, Grenoble (FR); Antonio De Domenico, Grenoble (FR); Gourab Ghatak, Grenoble (FR); Remun Koirala, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/104,408

(22) Filed: Nov. 25, 2020

(65) Prior Publication Data

US 2021/0194560 A1    Jun. 24, 2021

(30) Foreign Application Priority Data

Dec. 20, 2019  (EP) .................................... 19218796

(51) Int. Cl.
| | |
|---|---|
| *H04L 5/12* | (2006.01) |
| *H04B 7/06* | (2006.01) |
| *H04B 17/27* | (2015.01) |
| *H04B 17/382* | (2015.01) |
| *H04W 72/04* | (2009.01) |

(52) U.S. Cl.
CPC ......... *H04B 7/0639* (2013.01); *H04B 7/0695* (2013.01); *H04B 17/27* (2015.01); *H04B 17/382* (2015.01); *H04W 72/042* (2013.01)

(58) Field of Classification Search
CPC .... H04B 7/0639; H04B 17/27; H04B 17/382; H04B 7/0695; H04W 72/042
USPC .......................................................... 375/262
See application file for complete search history.

(56) References Cited

U.S. PATENT DOCUMENTS

| | | | | |
|---|---|---|---|---|
| 10,277,349 | B1* | 4/2019 | Kotecha | H04J 11/0086 |
| 2018/0006702 | A1* | 1/2018 | Doostnejad | H04B 7/088 |
| 2018/0198509 | A1* | 7/2018 | Nilsson | H04B 7/0695 |
| 2018/0227027 | A1* | 8/2018 | Trainin | H04B 7/0617 |

(Continued)

OTHER PUBLICATIONS

U.S. Appl. No. 16/681,973, filed Nov. 13, 2019, 2020/0162930 A1, Miscopein, B, et al.

(Continued)

*Primary Examiner* — Helene E Tayong
(74) *Attorney, Agent, or Firm* — Oblon, McClelland, Maier & Neustadt, L.L.P.

(57) ABSTRACT

A fast beam training method for a couple of user equipment, UE, and base station, BS, belonging to a mobile communication network such as a 5G network. A pair of iterative loops involves the UE and the BS, and iteratively refine the respective orientation and beamwidth of the transmit beam at the BS side and receive beam at UE side, based on an iteratively refined estimate of the UE position and Angle of Arrival at the UE. The iterative loops can be performed in series or in parallel. The beam training method converges when predetermined constraints on the standard deviations of the estimated UE position and estimated angle of arrival of the downlink signal at the UE are both met. The refined position of the UE can be used for a subsequent localization-assisted communication.

14 Claims, 4 Drawing Sheets

(56) References Cited

U.S. PATENT DOCUMENTS

2019/0074890 A1* 3/2019 Chang ................ H04B 7/0695
2019/0356368 A1* 11/2019 Liu .................... H04B 7/0617

OTHER PUBLICATIONS

U.S. Appl. No. 17/064,736, filed Oct. 7, 2020, De Domenico et al.
U.S. Appl. No. 17/064,761, filed Oct. 7, 2020, De Domenico et al.
European Search Report dated Mar. 20, 2020 in European Application 19218796.1 filed on Dec. 20, 2019, 1 page.
Xie et al., "Position-Aided Fast Beam Training in mm-Wave Multiuser MIMO Systems", Journal of Communications Technology and Electronics, vol. 64, No. 12, XP037029870, Dec. 1, 2019, pp. 1391-1397.
Nor et al., "Li-Fi Positioning or Efficient Millimeter Wave Beamforming Training in Indoor Environment", Mobile Networks and Applications, vol. 24, No. 2, XP036750845, Oct. 27, 218, pp. 517-531.
Xie et al., "Position-aided fast millimetre-wave beam training with compressive sensing", Electronics Letters, vol. 54, No. 19, XP006075273, Sep. 20, 2018, 2 pages.
Giordani et al., "Initial Access in 5G mm-Wave Cellular Networks", IEEE Communications Magazine, vol. 54, No. 11, Nov. 2016, pp. 40-47.

* cited by examiner

ITERATIVE BEAM TRAINING METHOD FOR ACCESSING A MM-WAVE NETWORK

FIELD OF THE INVENTION

The present invention concerns the field of $5^{th}$ generation (5G) of mobile wireless networks, especially the initial access phase of a user equipment (UE) during which the serving base station (BS) and the user equipment try to achieve a beam alignment.

BACKGROUND OF THE INVENTION

The mm-wave bands offer spectrum orders of magnitude greater than those of 4G systems and are therefore regarded as a key feature of 5G networks. Although mm-wave communications are expected to meet the growing needs in terms of data traffic and network loads, they are also characterised by high path loss and sensitivity to blockages. In fact, radio propagation properties at such frequencies are adversely affected by severe isotropic power attenuation as a function of the transmission range and the presence of physical obstacles between the transmitter and the receiver. On the other hand, the use of high frequencies also enables a large number of small antenna elements to be integrated on both the transmitter and the receiver. It is therefore possible to overcome the above-mentioned propagation issues by forming directive beams with antenna arrays located at the base stations (SBS in case of 5G networks) and user equipments (UEs). However, in order for beamforming to be efficient, the beams at the transmitter and the receiver should be thin (thereby providing sufficient power gain in the pointing directions) and correctly aligned. This is of particular importance within mm-wave networks, especially in the context of small cells of 5G networks. Indeed, 5G networks are heterogeneous by nature and comprise a layer of small cells operating in the mm-wave range in order to ensure high data rates and a layer of macro-cells ensuring seamless coverage.

The process of beam training, that is for the UE and the serving BS, the determination of the orientation and width of the beams required to establish a physical link between the UE and the BS is essential during the phase of initial access of the UE to a 5G network.

Beam training during initial access or directional cell discovery has been largely investigated in the prior art.

First, it has been proposed to perform an exhaustive directional scanning of the discretized angular space both at the UE side and at the BS side, namely to test all possible beam directions for Tx-RX pairs, either randomly or systematically. This solution clearly leads to large latency and overhead.

This solution has been improved by first transmitting at the Tx side in a few directions with a wide beam and then iteratively refining the beam characteristics until a strong link in terms of SNR (signal to noise ratio) could be established.

Another approach has been proposed in the paper by M. Giordani et al. entitled "Initial access in 5G-mm wave cellular networks" published in IEEE Communications Magazine, vol. 54, No. 11, pp. 40-47, November 2016. According to this approach, a macro-cell BS (MBS) broadcasts the GPS coordinates of all the small cell BS (SBS) within its range and each UE can obtain its own GPS coordinates. The UE then selects the SBS it is closest to and steers a beam towards the direct propagation path. Meanwhile, the SBS performs an exhaustive angular search in order to detect the best transmit-receive direction. This exhaustive search at the SBS side still leads to substantive delay and therefore to unacceptable latency in some instances.

Furthermore, 5G cellular networks will witness an explosion of new services, some of them requiring high-accuracy localization of the UE such as localization-assisted communications.

An object of the present invention is therefore to propose a beam training method for a couple of UE and BS, in particular during the initial access phase to a 5G network, which converges faster than in the prior art. A subsidiary object of the invention is to provide high resolution localization information of the UE, thereby enabling localization-assisted communication after the UE has accessed to the network.

BRIEF DESCRIPTION OF THE INVENTION

The present invention is defined by the appended independent claims. Various preferred embodiments are defined in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

Without loss of generality, the present invention will be described within the context of an initial access phase of a UE to a 5G network. It will nevertheless be understood by the man skilled in the art that the invention is not limited to 5G networks nor even to mm-wave networks as referred to in the introductory part. The invention will more generally apply to a UE and a BS of a cellular network wishing to establish a directive physical link by using beams at both sides of this link.

The 5G network comprises a layer of small cells which can communicate with the UE in the mm-wave band. It should be noted that this does not exclude a communication in another band, e.g., sub-6 GHz band or, more generally, systems communicating through multiple radio access technologies (multi-RAT).

Figure 1:
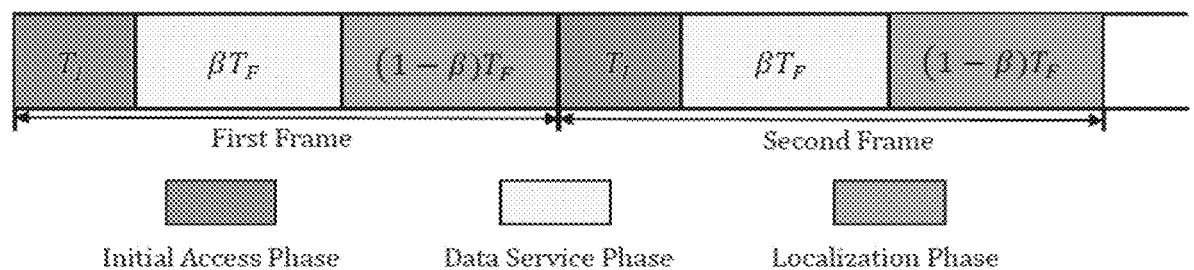
FIG. 1 schematically illustrates a frame structure used in a localization assisted communication.

A frame structure enabling both communication and localization services is represented in FIG. 1.

Each frame comprises an initial access phase of length $T_I$ and a service phase of length $T_F$, the latter being divided into a data service phase of length $\beta T_F$ and a localization phase of length $(1-\beta)T_F$ where $0<\beta1$.

The access phase ensures reliable subsequent mm-wave communication and/or localization in the data service phase and the localization phase, respectively. More specifically, the initial phase allows to determine the characteristics of a pair of Tx and Rx beams to establish a directive physical link in the mm-wave band, and further provides an accurate estimate of the position of the UE for the localization service requirements.

In order to simplify the presentation, and again without loss of generality, the invention will be explained with respect to a 1D geometric model. Such a model is appropriate in case of BSs deployed along a road for example but in general a 2D or 3D geometric model will have to be taken into account. The extension to a 2D or 3D scenario does not invalidate the following conclusions, though.

Figure 2:
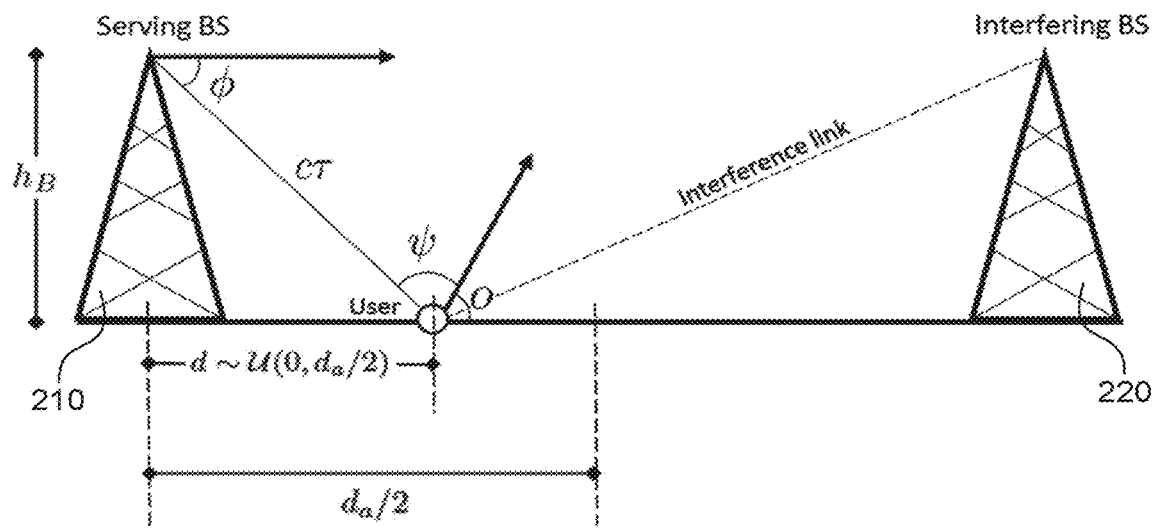
FIG. 2 schematically illustrates a geometric model showing the position of a UE in a network.

FIG. 2 schematically illustrates a 1D geometric model showing position of a UE within the cellular network.

For convenience, the BS, 210, serving the UE is assumed to be located at the origin. The UE is located at a distance d of the serving base station, where d is assumed to be a sample of a random variable U uniformly distributed over $$\left[0, \frac{d_a}{2}\right],$$

i.e.

$$d \sqcup U\left(\left[0, \frac{d_a}{2}\right]\right) \text{ and } \frac{d_a}{2}$$

is the radius of the cell, $d_a$ being the inter BS distance. In the present instance, a neighbouring interfering BS has been represented at 220.

Similarly, in case of 2D geometric model for example, the position of the UE would be assumed to be sampled from a bidimensional random variable exhibiting a uniform distribution on a disk of radius $$\frac{d_a}{2}$$

and the position of the UE could be defined by the distance to the base station, together with an angle with respect to a line passing through BSs 210 and 220.

Turning back to the 1D model, the angle of departure of the signal transmitted by the serving BS is denoted $\phi$, whereas the angle of arrival of the signal at the UE is denoted $\psi$. In other words, $\psi$ is the angle between the pointing direction of the receiving beam and the direction of the incoming signal. In case of LOS (Line Of Sight), $\phi$ is the angle between the horizontal and the pointing direction of the transmitting beam. The angle between the receiving beam of the UE and the horizontal is denoted o.

We will also assume in the following that the serving BS is provided with a plurality of beam dictionaries $BD_k$, k=1, ..., N. Each dictionary $BD_k$ is associated with a given beamwidth $\theta_k$ and defines a set of beams of beamwidth $\theta_k$ and different orientations (or angles of departure), $B_{j,k}$, j=1, ..., k. Hence, each dictionary $BD_k$ can be defined as a list of pairs $(\theta_k, \phi_{j,k})$, j=1, ..., k where $\phi_{j,k}$, j=1, ..., k are the respective orientations of the beams. In the case of the 1D model, dictionary $BD_k$ may alternatively be defined by a list of triplets $(\theta_k, d_{j,k}^L, d_{j,k}^R)$ where $d_{j,k}^L$ and $d_{j,k}^R$ respectively define the left and right boundaries of the beam coverage (beam sectorized model) on the line passing through BSs 210 and 220. In the case of a 2D model, the beams of dictionary $BD_k$ would be defined by the beamwidth $\theta_k$, the coordinates of the centre of the beam coverage and the associated radius.

The plurality of beam dictionaries can be represented more concisely in a N×N matrix BD stacking the beam dictionaries. For example, where the triplet beam definition is adopted:

$$BD = \begin{bmatrix} (\theta_1, d_{1,1}^L, d_{1,1}^R) & - & \cdots & - \\ (\theta_2, d_{1,2}^L, d_{1,2}^R) & (\theta_2, d_{2,2}^L, d_{2,2}^R) & \cdots & - \\ \vdots & \vdots & \ddots & \vdots \\ (\theta_K, d_{1,N}^L, d_{1,N}^R) & (\theta_N, d_{2,N}^L, d_{2,N}^R) & \cdots & (\theta_K, d_{N,N}^L, d_{N,N}^R) \end{bmatrix} \quad (1)$$

Each row of matrix BD corresponds to a dictionary and each element of this row defines a beam belonging to this dictionary.

The beams of a dictionary provide a complete coverage of the cell served by the BS (in practice beams may point in positive and negative directions depending upon the shape of the cell). Consequently, the smaller the beamwidth $\theta_k$, the higher the number N of beams in dictionary $BD_k$.

Figure 3:
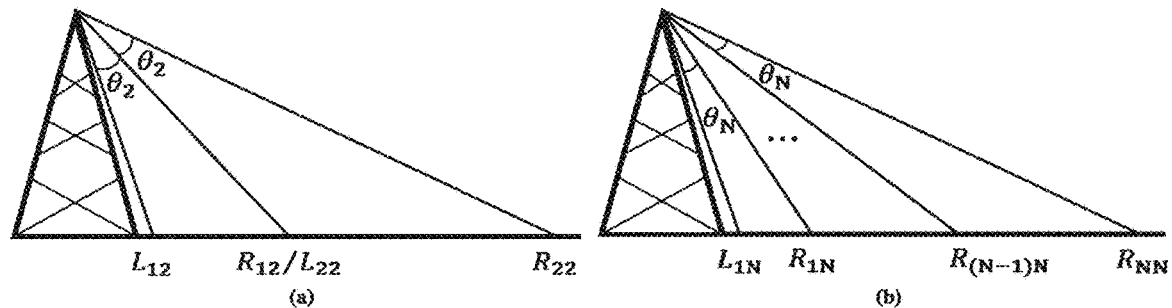
FIG. 3 schematically illustrates the coverage of a cell by beams of two beam dictionaries.

FIG. 3 shows the coverage of a cell by beams belonging to a dictionary.

For the sake of simplicity, we have only represented one side of the 1D cell model. In practice, it will be understood that beams of a dictionary may point either to the left or to the right.

The left part of the figure shows an example of cell coverage provided by beams belonging to $BD_2$, that is $(\theta_2, d_{1,2}^L, d_{1,2}^R)$ and $(\theta_2, d_{2,2}^L, d_{2,2}^R)$.

The right part of the figure shows an example of cell coverage provided by beams belonging to $BD_N$, that is $(\theta_N, d_{1,N}^L, d_{1,N}^R), (\theta_N, d_{2,N}^L, d_{2,N}^R), \ldots, (\theta_N, d_{N,N}^L, d_{N,N}^R)$.

The partition $\Omega_k$ of the cell induced by the beams of dictionary $BD_k$ can be expressed by a list of contiguous elementary coverage areas:

$$\Omega_k = \{[d_{j,k}^L, d_{j,k}^R]; j=1, \ldots, k\} \quad (2)$$

where $\omega_{j,k} = [d_{j,k}^L, d_{j,k}^R]$ denotes the elementary coverage area corresponding to beam $$(\theta_k, d_{j,k}^L, d_{j,k}^R), \text{ with } d_{1,k}^L = 0, d_{k,k}^R = \frac{d_a}{2}, d_{j,k}^L = d_{j-1,k}^R; j = 2, \ldots, k.$$

Two main sources of errors may affect beam training.

The first source of errors relates to beam selection at the BS side. Indeed, relying on an estimate, $\hat{d}$, of the position of the UE, the BS may select a beam of a dictionary which does not cover the UE, actually located at position d.

Figure 4A:
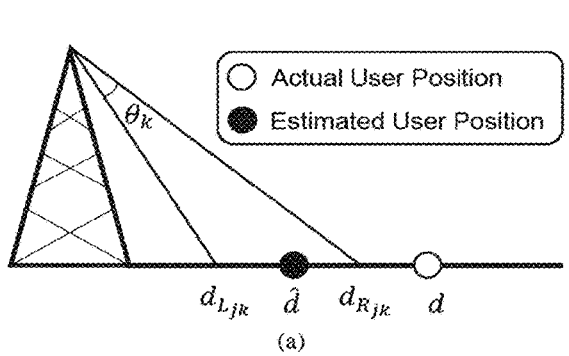
FIGS. 4A and 4B respectively illustrate a beam selection error scenario and a beam misalignment error scenario.

FIG. 4A represents a scenario of erroneous beam selection at the BS. The UE position estimate $\hat{d}$ is found to be within $\omega_{j,k}$ whereas it actually lies outside this range.

The probability of erroneously selecting beam $B_{j,k} \in BD_k$ can be expressed as follows:

$$P_{j,k}^{BS}(\hat{d}) = P(\hat{d} \notin \omega_{j,k} | d \in \omega_{j,k}) \quad (3)$$

This probability of error depends on the position of the UE and will be therefore referred to as localization-based beam selection error. Assuming that the UE position estimate $\hat{d}$ is a Gaussian random variable centered around d and of standard deviation $\sigma_d$, the localized-based beam selection error can be obtained by:

$$P_{j,k}^{BS}(\hat{d},\sigma_d) = P(\hat{d} < d_{j,k}^L) + P(\hat{d} > d_{j,k}^R) \quad (4)$$
$$= 1 - Q\left(\frac{d_{j,k}^L - \hat{d}}{\sigma_d}\right) + Q\left(\frac{\hat{d} - d_{j,k}^R}{\sigma_d}\right)$$

where Q(.) is the tail distribution function of the standard normal distribution.

The second source of errors relates to beamforming at the UE side. Indeed, relying on an estimate, $\hat{\psi}$ of the angle of arrival (AoA) of the downlink signal, the UE may form a beam which is not directed to the actual angle of arrival $\psi$.

Figure 4B:
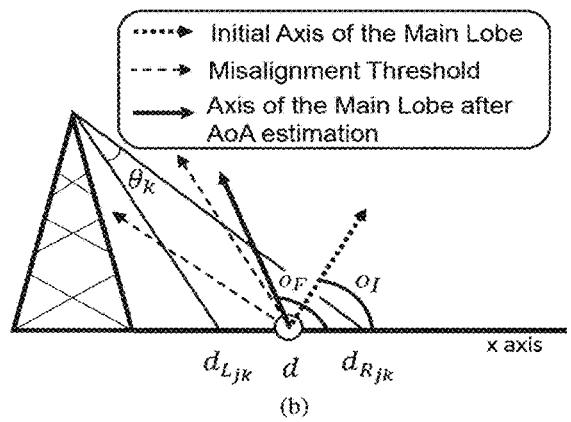

FIG. 4B represents a scenario of erroneous beamforming at the UE side. The BS has selected beam $B_{j,k}$ and the UE has oriented the main lobe of the receive beam towards direction $\hat{\psi}$ in order to align it with the main lobe of $B_{j,k}$.

The initial orientation of the UE receive beam is designated by $o_I$. After having received pilot signals from the BS, the UE estimates the AoA and forms/orientates the receive beam in direction $o_F$. This applies whether beam $B_{j,k}$ has been correctly selected or not.

When beam $B_{j,k}$ has been correctly selected, the probability of misaligning the receive beam with the main lobe of $B_{j,k}$ can be expressed as follows:

$$P_{j,k}^{MA}(\hat{d},\hat{\psi}) = P(|\hat{\psi} - \psi| > v) \quad (5)$$

where v is a misalignment threshold.

Assuming that $\hat{\psi}$ is a Gaussian random variable centred around and of standard deviation $\sigma_\psi$, the localized-based beam alignment error can be obtained by:

$$P_{j,k}^{MA}(\hat{d},\hat{\psi},\sigma_\psi) = 2Q\left(\frac{v}{\sigma_\psi}\right) \quad (6)$$

The variance $\sigma_d^2$ is lower bounded by the theoretical Cramer-Rao Lower Bound (CRLB) or the tighter Ziv-Zakai Bound (ZZB) related to any unbiased estimator of d. The standard deviation $\sigma_d$ can therefore be approximated by the square root of the CRLB or the ZZB.

Alternatively, standard deviation $\sigma_d$ can be empirically provided by a practical estimator.

Finally, if the distance estimate is obtained from a GPS receiver, the standard deviation can be obtained by the GPS theoretical error multiplied by the GDOP (Geometric Dilution On Precision) coefficient.

Similarly, the standard deviation $\sigma_\psi$ can be approximated by the CRLB or the ZZB related to any unbiased estimator of $\psi$, empirically provided by a practical estimator.

The beam training method according to the present invention uses a pair of iterative loops involving both the UE and the BS.

Figure 5:
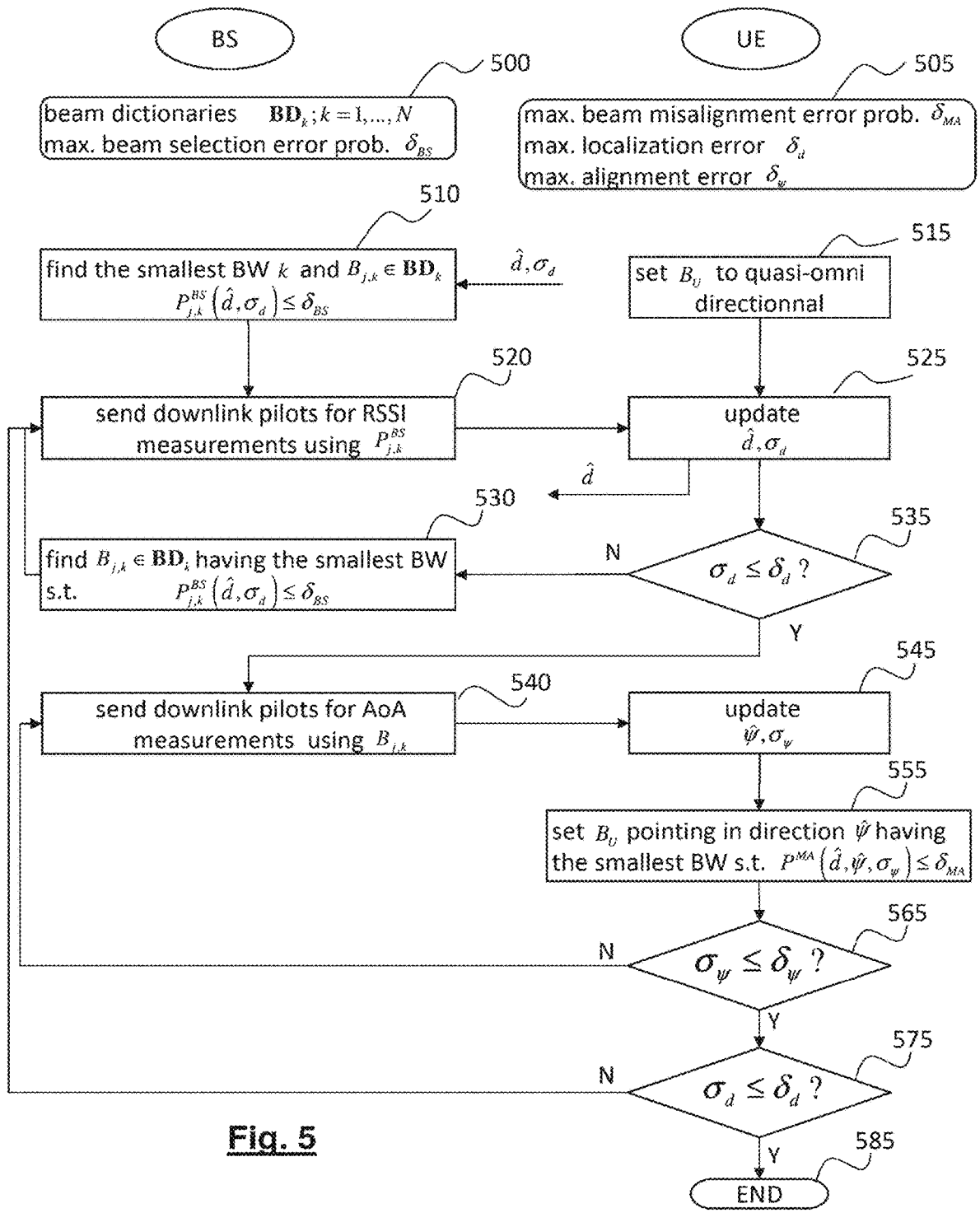
FIG. 5 represents the flowchart of an iterative beam training method according to an embodiment of the invention.

More specifically, FIG. 5 represents the flowchart of an iterative beam training method according to an embodiment of the invention.

The BS is provided beforehand at 500 with a plurality of beam dictionaries $BD_k$, k=1, . . . ,N, and with an a priori maximum beam selection error probability, $\delta_{BS}$ and a maximum localization error threshold, $\delta_d$.

Similarly, the UE is provided beforehand at 505 with an a priori maximum beam alignment error probability, $\delta_{MA}$, and a maximum alignment error threshold, $\delta_\psi$.

The beam training method is initialized by step 510 at the BS and step 515 at the UE.

More specifically, the BS relies at 510 on a coarse localization information, i.e., a coarse estimate of the position of the UE, for selecting a beam $B_{j,k} \in BD$ having the smallest possible beamwidth, $\theta_k$, while covering the UE and meeting a constraint with respect to the maximum beam selection probability, $\delta_{BS}$:

$$P_{j,k}^{BS}(\hat{d}\sigma_d) \leq \delta_{BS} \quad (7)$$

The coarse localization information may be obtained in various ways.

For example, in a case of a 5G network, it may be determined from a sub-6 GHz signal RSSI measurement (providing a 1D range-dependent position information) performed at the UE and sent back to the MBS and further relayed to the BS covering the UE. Alternatively, it can be obtained by triangulation or trilateration (providing a 2D position information) in the sub-6 GHz band and sent by the UE to the BS. Further alternatively, the coarse localization information may be provided by an external system such as one based on GPS, BLE or RFID technology.

In some instances, the coarse location information may simply be the cell served by the BS. In such a case, the position of the UE is assumed to be an average UE position in the cell and the localization uncertainty is assumed to be the cell size.

On the UE side, the initial beam is formed to have a quasi-omni directional radiation pattern.

After the initialization phase, the UE and BS enter a first iterative loop, in which:

At step 520, the BS uses its current selected beam, $B_S = B_{j,k}$, to transmit first downlink pilot symbols to the UE and the UE updates its position estimate, $\hat{d}$, and the position standard deviation, $\sigma_d$, from said first downlink pilot symbols thus received.

The UE transfers to the BS its updated position estimate, $\hat{d}$. The BS may use this emission on the uplink to obtain an independent position estimate and combine it with the one received from the UE so as to refine it.

The UE then checks at step 535 whether the position standard deviation of the position, $\sigma_d$, lies below maximum localization error threshold, $\delta_d$.

In the negative, the UE informs the BS and the BS, at step 530, looks up in the set of beam dictionaries BD for a new beam $B_{j,k}$ having the smallest possible bandwidth while covering the UE and verifying constraint (7).

In the affirmative, the UE and BS enter a second iterative loop, in which:

At step 540, the BS sends second downlink pilot symbols. The second pilot symbols may be identical to the first pilot symbols sent at step 520.

At step 545, the UE determines an estimate, $\hat{\psi}$, of the angle of arrival as well as the standard deviation thereof, $\sigma_\psi$, from said second pilot symbols sent by the BS.

According to a variant (not shown) step 540 can be skipped and the estimation of the angle of arrival is performed jointly with the estimation of the position on the downlink pilots (sent by the BS at step 520 and) received by the UE. In such a case, the update of the position and the update of the angle of arrival are carried out in a single step.

At step 555, the UE forms a beam, $B_U$, in direction $\hat{\psi}$, having the smallest possible beamwidth verifying a constraint with respect to the maximum alignment error probability, $\delta_{MA}$, that is:

$$P^{MA}(\hat{d},\hat{\psi},\sigma_\psi) \leq \delta_{MA} \quad (8)$$

The UE then checks at step 565 whether the standard deviation of angle of arrival lies below maximum threshold, $\delta_\psi$.

In the negative, the UE informs the BS which sends again pilot symbols on the downlink at step 540.

In the affirmative, the UE checks again whether the standard deviation of its position lies below maximum threshold, $\delta_d$.

In the negative, the beam searching method goes back to step 520. However, in the affirmative, the method stops at step 585.

It should be noted that the first loop and second loop can be exchanged, i.e., the beam training can start with iterations on the estimation of angle of arrival and then go on with iterations on the estimation of the position of the UE.

The first loop and second loop being independent from each other, provided they share the same UE position estimate, $\hat{d}$ (and therefore the same beam $\beta_{j,k}$), it will be appreciated that they can be run in parallel or in an interleaved manner. Once the conditions set out at steps 535 and 545 are both met for the same beam, the iterative algorithm stops.

The first and second loops can also be performed sequentially but in the reverse order.

Whatever the embodiment envisaged, the iterations are stopped when both constraints on standard deviation (or variance) of position and standard deviation (or variance) of angle of arrival are met. Furthermore, in order to avoid lengthy convergence and therefore unacceptably high latency, the iterations may also be stopped whenever a predetermined number of iterations has been reached.

The beam training method has been described in the case of a fixed set of beam dictionaries, BD, stored at the BS. It should be understood however that the set of beam dictionaries may be adaptive. Furthermore, the dictionary $BD_k$ of BD comprises beams whose the pointing directions are angularly non-uniformly distributed and/or which exhibit different beamwidths in different pointing directions in order to ensure optimal coverage of the cell. The density and beamwitdh of these different beams can be heuristically determined during a measurement campaign or a simulation phase.

Similarly, at the UE side, adaptive beamforming has been assumed. However, it should be understood that beam $B_U$ can be selected in a user beam dictionaries instead. Non-uniform angular and/or beamwidth distribution can also be envisaged as for the BS.

Finally, the beam training method according to the invention has been implicitly described in the context of LOS (Line Of Sight) between the BS and the UE, thereby requiring an alignment of the transmit beam, $B_S$ and the receive beam, $B_U$. However, in some instances, especially for mm-wave networks such as 5G networks, radio blockage may occur between the UE and the serving BS. In such a case, beam training may still apply, the transmit beam $B_S$ and the receive beam, $B_U$ pointing to the secondary propagation path (the direct propagation path being blocked) according to the estimated Angle of Departure (AoD) and the Angle of Arrival (AoA), respectively at the BS side and the UE side. In such instance, the beam training method would not rely on the position of the UE but rather on the AoD to select a beam in the beam dictionary $BD_k$.

At any rate, the beam training method according to the present invention converges faster than the beam training methods of the prior art set out in the introduction, in particular those based on exhaustive beam training and hierarchical beam training. It also provides a high spatial resolution and therefore an accurate localization information i.e., an accurate estimate of the position of the UE which can be used in localization assisted communications.

Figure 6:
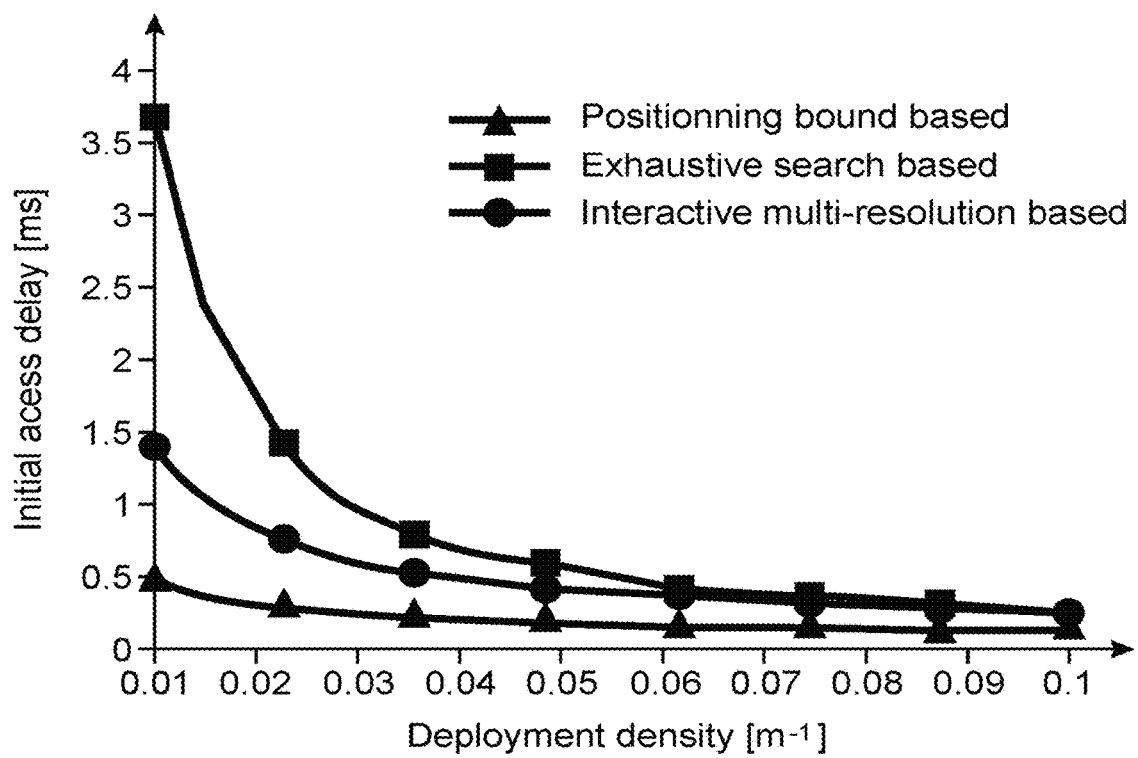
FIG. 6 represents the delay of the initial access phase with respect to the deployment density.

FIG. 6 represents the delay of an initial access phase using a beam training method according to the present invention, as a function of the deployment density.

For a given deployment density (expressed in $m^{-1}$ for a 1D model), the beam training method according to the invention (designated by "positioning bound based") is clearly faster than the beam training method of the prior art, i.e., an exhaustive beam training (designated by "exhaustive search based") and a hierarchical beam training (designated by "iterative multi-resolution based").

For the exhaustive search, the beamwidth of the BS and the UE is considered to be fixed and equal to $\theta_B$ and $\theta_U$ respectively, that is the beamwidth retained once the beam training method according to invention has converged.

For hierarchical beam training, the search has been assumed to start with k=2 while the user forms an omni-directional beam. Then the BS identifies the beam that results in the highest downlink SNR and changes its search space to the region covered by that beam. Then, the BS changes its beam size to a thinner one (k=4) and uses 2 out of the 4 beams from the dictionary which lie within the modified search space. The initial beam-selection phase was assumed to terminate when this method selects the same beamwidth, $\theta_B$, as the one selected by the beam training method according to the present invention. Thereafter, the BS sets the selected beam and the UE carries out the same procedure for determining the receive beam.

Figure 7:
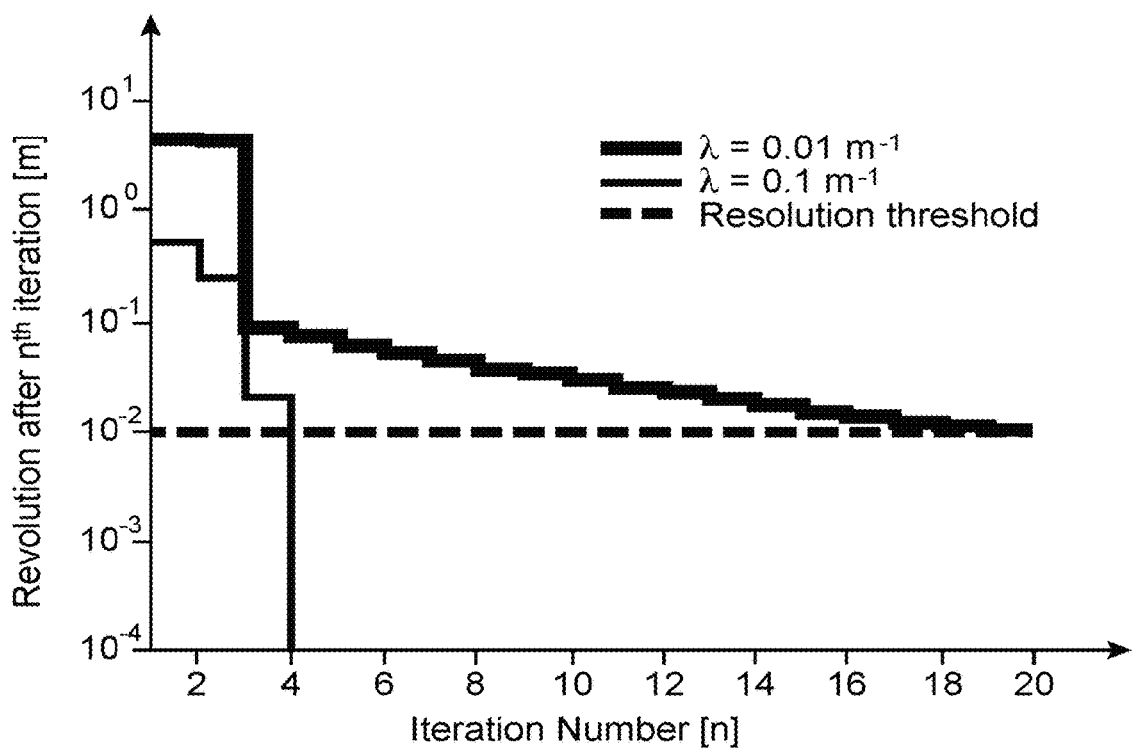
FIG. 7 represents the resolution level of the localization information with respect to the iteration number.

FIG. 7 represents the resolution level of the position estimate with respect to the iteration number, for the beam training method according to the invention.

This figure shows the enhancement in terms of positioning resolution (characterized as the variance $\sigma_d^2$ of the ranging error) with the number iterations of the beam training method according to an embodiment of the present invention. As expected, we note that for denser small cell deployments (e.g., $\lambda=0.1$ $m^{-1}$) the beam training method stops at a lower number (here 4) of iterations, as compared to the sparser deployment scenarios. As the deployment becomes sparser (e.g., $\lambda=0.01$ $m^{-1}$), a larger number of steps is required for initial access. This is due to the fact that SNR increases for denser deployments. Accordingly, a larger beamwidth is sufficient and a lower number of iterations is thereby required to meet the constraints on the standard deviation of position.

The invention claimed is:

1. A beam training method for a user equipment (UE) and a base station (BS) belonging to a mobile communication network, the BS comprising a memory storing a plurality of beam dictionaries ($BD_k$,k=1, . . . , N), wherein:
   the BS is initially provided with an estimate ($\hat{d}$) of a position of the UE along with a standard deviation ($\sigma_d$) of the estimate;
   the BS uses the UE position estimate and the standard deviation to select, in the plurality of beam dictionaries, an initial beam having a smallest beamwidth while covering the UE and meeting a constraint of a predetermined maximum beam selection error probability ($\delta_{BS}$), the BS and the UE performing a first iterative loop wherein:
(a) the BS transmits, to the UE, first downlink pilot symbols using a currently selected beam for the BS;
(b) the UE updates the UE position estimate and the standard deviation thereof from the transmitted first downlink pilot symbols and sends the updated position estimate and the updated standard deviation to the BS;
(c) the BS uses the updated UE position estimate and the updated standard deviation to select a beam having the smallest beamwidth while covering the UE and meeting the constraint of the predetermined maximum beam selection error probability ($\delta_{BS}$);

the first iterative loop being repeated until a standard deviation of the position of the UE lies below a predetermined position error threshold ($\delta_d$);

the BS and the UE performing a second iterative loop wherein:
(a') the BS transmits second downlink pilot symbols using the currently selected beam for the BS;
(b') the UE updates an estimate of a direction of arrival ($\hat{\psi}$) of a signal received from the BS and a standard deviation of this direction of arrival ($\delta_\psi$);
(c') the UE uses the updated direction of arrival and the standard deviation thereof to set a beam pointing towards the updated direction of arrival and having the smallest beamwidth meeting a constraint of a predetermined maximum beam alignment error probability ($\delta_{MA}$);

the iterations of the first and second iterative loops being stopped if the standard deviation of the position of the UE lies below a predetermined position error threshold ($\delta_d$) and the standard deviation of the direction of arrival lies below a predetermined angular error threshold.

2. The beam searching method according to claim 1, wherein the first and the second iterative loops are sequentially carried out, the second iterative loop being entered once the standard deviation of the position of the UE lies below the predetermined position error threshold ($\delta_d$) and the first iterative loop being entered once the standard deviation of the direction of arrival lies below the predetermined angular error threshold.

3. The beam training method according to claim 2, wherein the second downlink pilot symbols are the same as the first downlink pilot symbols.

4. The beam searching method according to claim 1, wherein the second and the first iterative loops are sequentially carried out, the first iterative loop being entered once the standard deviation of the direction of arrival lies below the predetermined angular error threshold and the second iterative loop being entered once the standard deviation of the position of the UE lies below the predetermined position error threshold ($\delta_d$).

5. The beam searching method according to claim 1, wherein the first and the second iterative loops are carried out in parallel, the first and the second iterative loops sharing the same position estimate of the UE.

6. The beam training method according to claim 5, wherein the first and the second iterative loops share the first and second downlink pilot symbols.

7. The beam training method according to claim 1, wherein the UE position estimate, which the BS is initially provided with, is obtained by a global positioning system (GPS), a bluetooth low energy (BLE) system, a wireless fidelity (WiFi) system, an impulse radio ultra-wideband (IR-UWB) system, a radio frequency identification (RFID) system, a 4G system, or any combination thereof, equipping the UE.

8. The beam training method according to claim 1, wherein the mobile communication network is a 5G network and the UE position estimate, which the BS is initially provided with, is determined by multilateration with sub-6 GHz signals.

9. The beam training method according to claim 1, wherein the UE position estimate, which the BS is initially provided with, is an average position within a cell where the UE is located.

10. The beam training method according to claim 1, wherein the standard deviation of the position estimate or a standard deviation of an angle of arrival is approximated by a Cramer-Rao Lower Bound or a Ziv-Zakai bound.

11. The beam training method according to claim 1, wherein each beam dictionary is associated with a given beamwidth and defines a set of beams having the same beamwidth and different pointing directions which are angularly uniformly distributed.

12. The beam training method according to claim 1, wherein each beam dictionary defines beams having various beamwidths or pointing directions which are angularly not uniformly distributed.

13. The beam training method according to claim 1, wherein the respective beamwidths or pointing directions of the beams of at least one beam dictionary of the plurality of beam dictionaries are dynamically defined.

14. The beam training method according to claim 1, wherein the mobile communication network is a 5G network.

* * * * *